Dec. 13, 1927.  1,652,865
J. LEDWINKA
AUTOMOBILE BODY
Filed Oct. 3, 1921   8 Sheets-Sheet 2
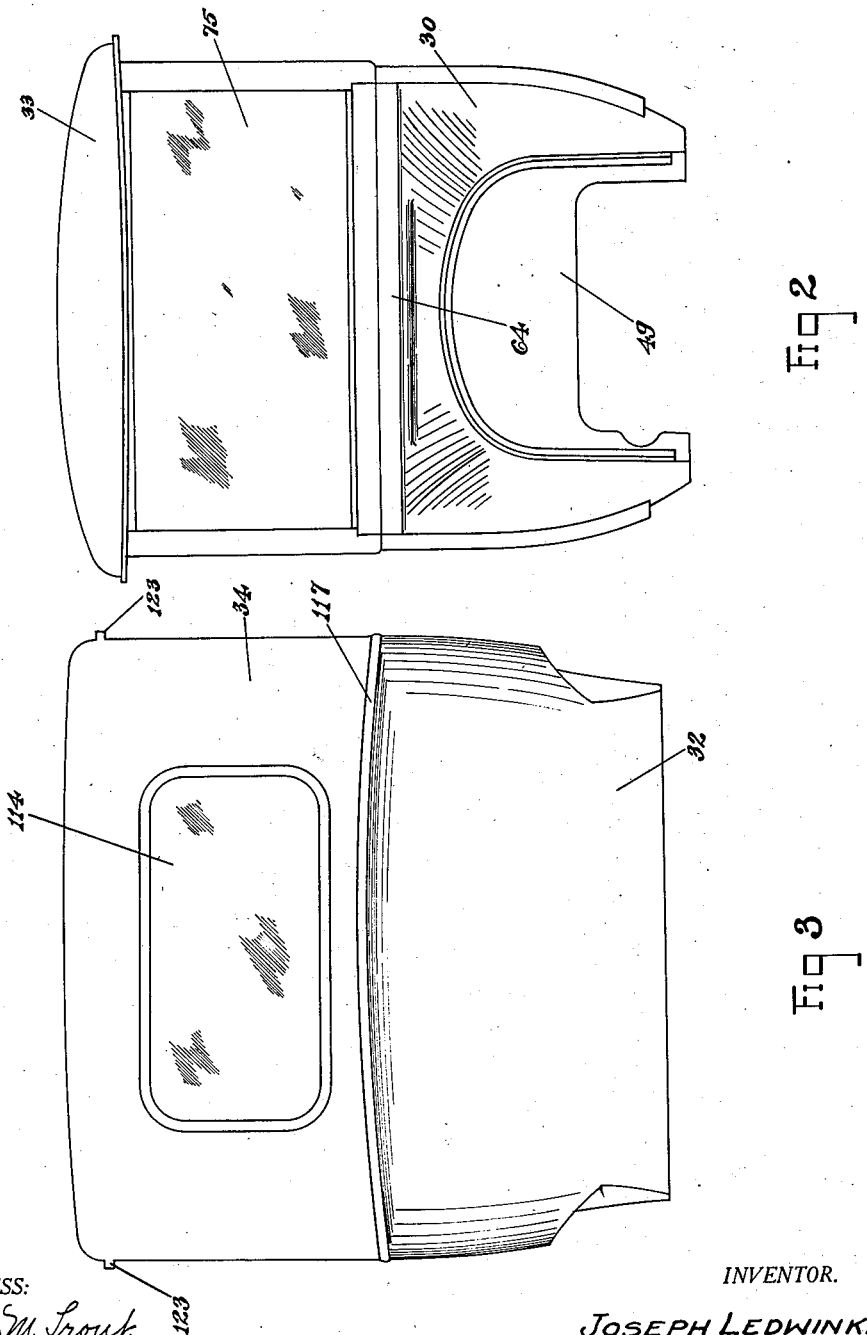
INVENTOR.
JOSEPH LEDWINKA.

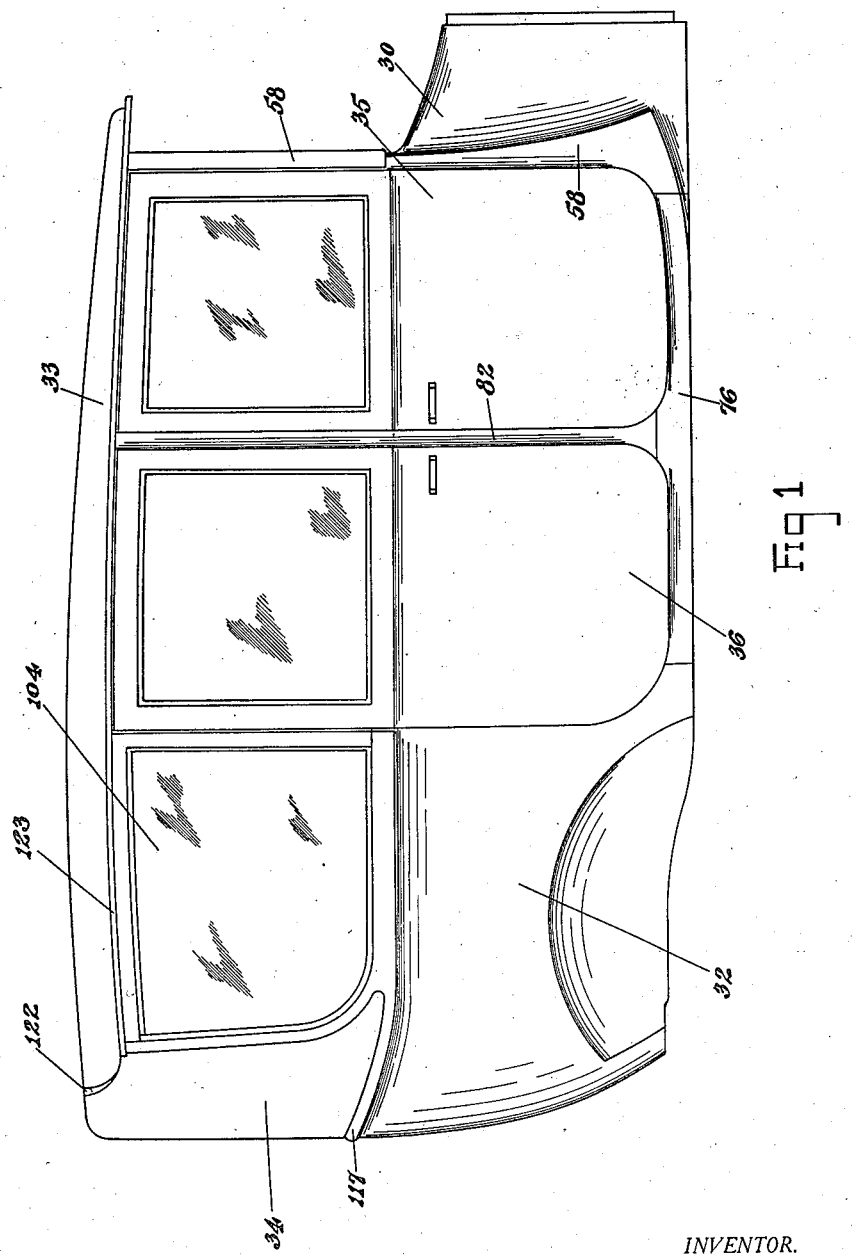

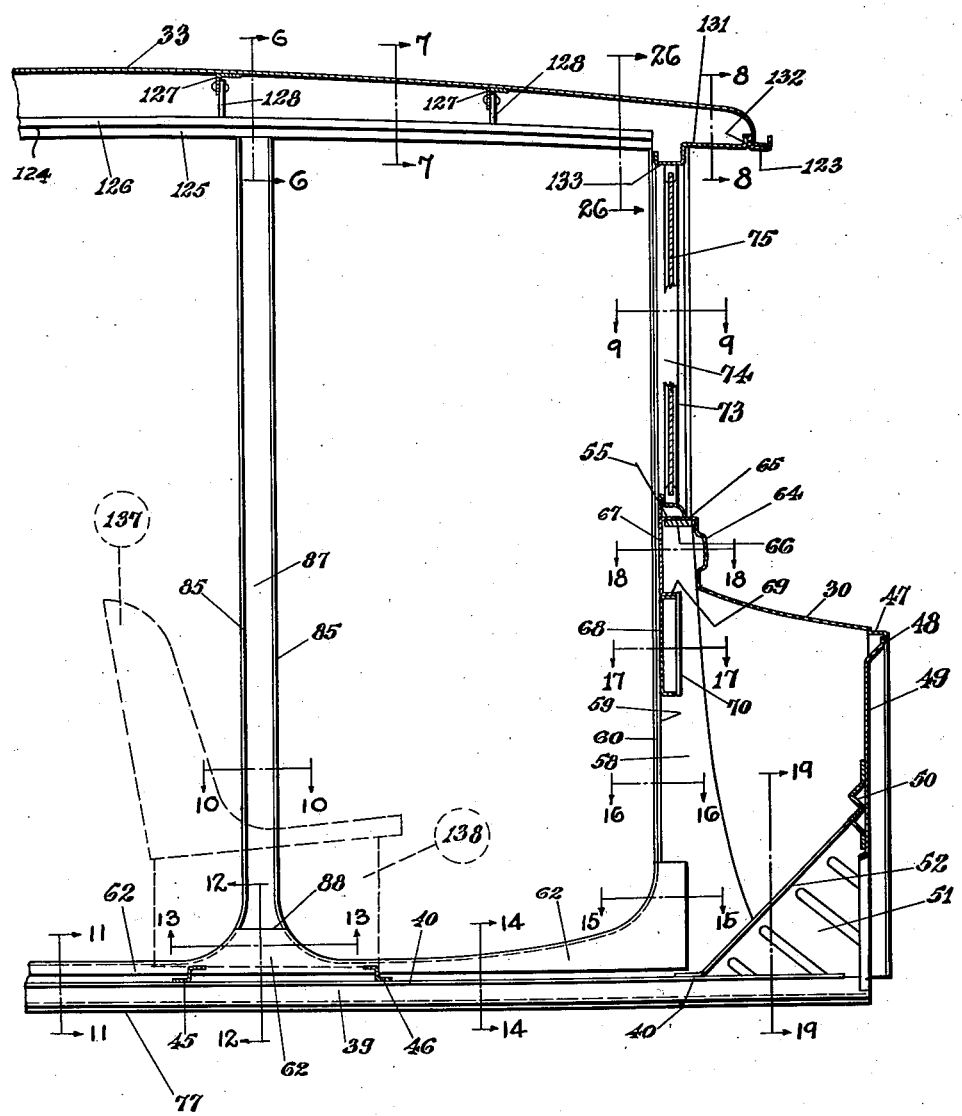

Dec. 13, 1927.

J. LEDWINKA 1,652,865

AUTOMOBILE BODY

Filed Oct. 3, 1921

INVENTOR.
JOSEPH LEDWINKA.
BY C.B. Des Jardins
ATTORNEY

Witness
Walter M Trout

Dec. 13, 1927. 1,652,865
J. LEDWINKA
AUTOMOBILE BODY
Filed Oct. 3, 1921 8 Sheets-Sheet 6

Witness
Walter M. Trout

INVENTOR.
JOSEPH LEDWINKA.
BY
C. B. Desjardins
ATTORNEY

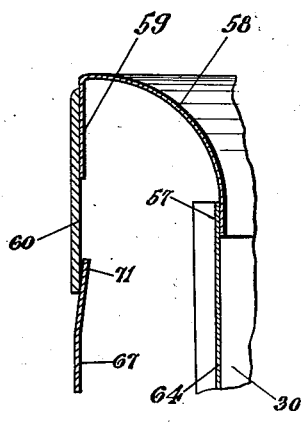
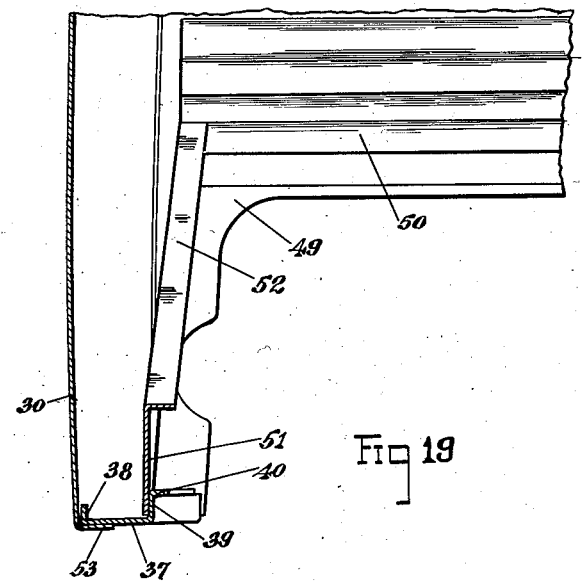
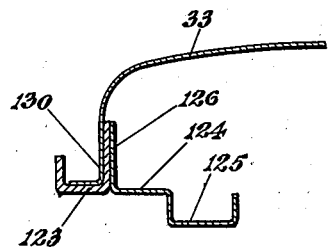
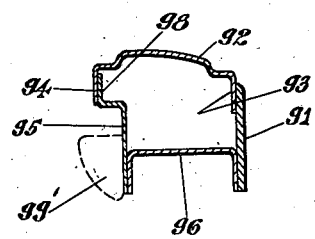
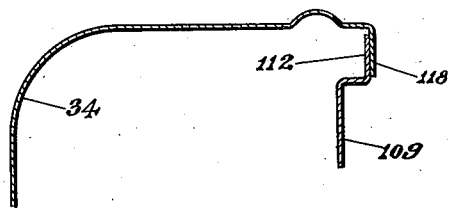

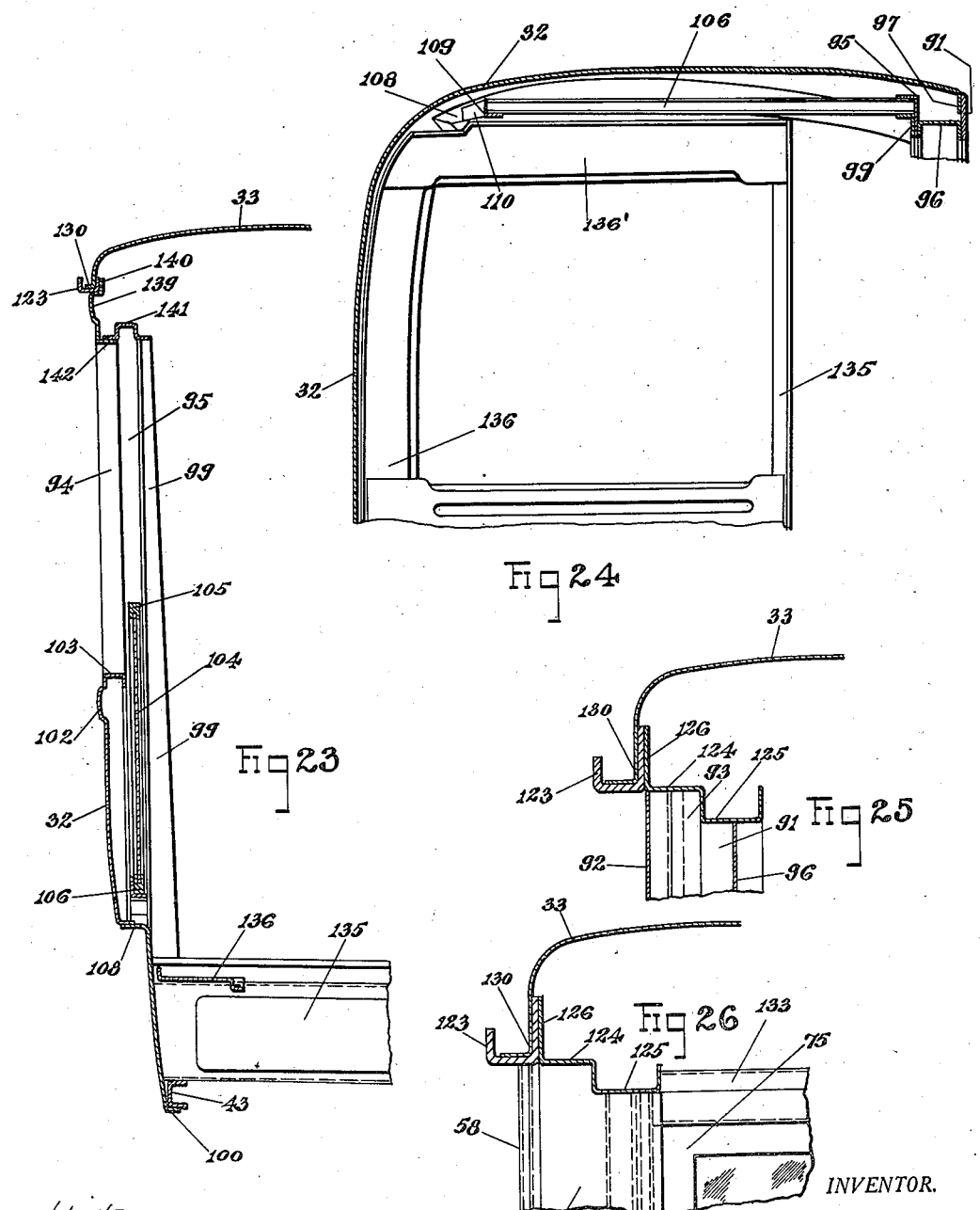

Patented Dec. 13, 1927.

1,652,865

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE BODY.

Application filed October 3, 1921. Serial No. 504,927.

This invention relates to improvements in automobile bodies and has to do more particularly with automobile bodies of the "closed" type, having a permanent top, as distinguished from the touring car or "open" type, having a collapsible top.

Heretofore, so far as I am aware, all automobile bodies of the "closed" type have been of "composite" construction, in which the sheet metal panels or sheathing are fastened on a wooden framework. The building of a body of this type has been, practically, a job for the cabinet-maker or coachbuilder since the parts of the wooden framework are not uniform and have to be fitted into place and built into the body individually. As a result, this type of body does not lend itself to efficient and economical production on a large scale. Furthermore, due to the wooden framework, it is impossible to submit the body to a baking temperature for the purpose of baking an enamel finish on it.

One object of my invention is to provide a "closed" body constructed entirely of metal parts or stampings, which may be produced in large quantities efficiently and with uniformity, and which may be assembled easily to form the complete body.

Another object of my invention is to provide an automobile body of the "closed" type, constructed entirely of metal, so that the heavy and expensive wooden framework of the "composite" body is eliminated.

Another object of my invention is to provide an automobile body of the "closed" type, which shall be comparatively light and, at the same time, very strong and rugged in construction.

Another object of my invention is to provide an automobile body of the "closed" type in which the weight of the roof or permanent top structure is reduced so as to lessen the swaying to and fro of the body, when traveling over the road at high speed.

A further object of my invention is to provide an automobile body of the "closed" type which is constructed entirely of metal so that the entire body may be submitted to a baking heat to bake an enamel on the body, thus giving a more durable and satisfactory body finish.

Further objects, and objects relating to details and economies of construction and operation, will definitely appear from the detailed description to follow. My invention is clearly defined and pointed out in the appended claims. A structure constituting a preferred embodiment of my invention is illustrated in the accompanying drawings, forming a part of this specification, in which:

Fig. 1 is a view in side elevation of a body constructed in accordance with my invention.

Fig. 2 is a view of the body in front elevation.

Fig. 3 is a view of the body in rear elevation.

Fig. 4 is a vertical longitudinal, sectional view through the front portion of the body.

Fig. 18 is a sectional view on the line 18—18 of Fig. 4.

Fig. 19 is a sectional view through one of the body sills and a part of the cowl, showing one of the toe-board supports, this view being taken on the line 19—19 of Fig. 4.

Fig. 20 is a sectional view through a part of the roof structure, taken on the line 20—20 of Fig. 5.

Fig. 21 is a sectional view through the upper part of one of the rear door posts, taken on the line 21—21 of Fig. 5.

Fig. 22 is a sectional view through a portion of the rear panel, taken on the line 22—22 of Fig. 5.

Fig. 23 is a vertical, transverse, sectional view through one side of the rear portion of the body, taken on the line 23—23 of Fig. 5.

Fig. 24 is a horizontal, sectional view of a portion of the tonneau, taken on the line 24—24 of Fig. 5.

Fig. 25 is a sectional view through a part of the roof structure showing its connection with one of the rear door posts, taken on the line 25—25 of Fig. 5, and Fig. 26 is a sectional view through the roof structure showing its connection with one of the front door posts, taken on the line 26—26 of Fig. 4.

In the drawings, the same reference numerals refer to the same parts throughout the several views and the sectional views are taken looking in the direction of the arrows at the ends of the section lines.

Figure 5:
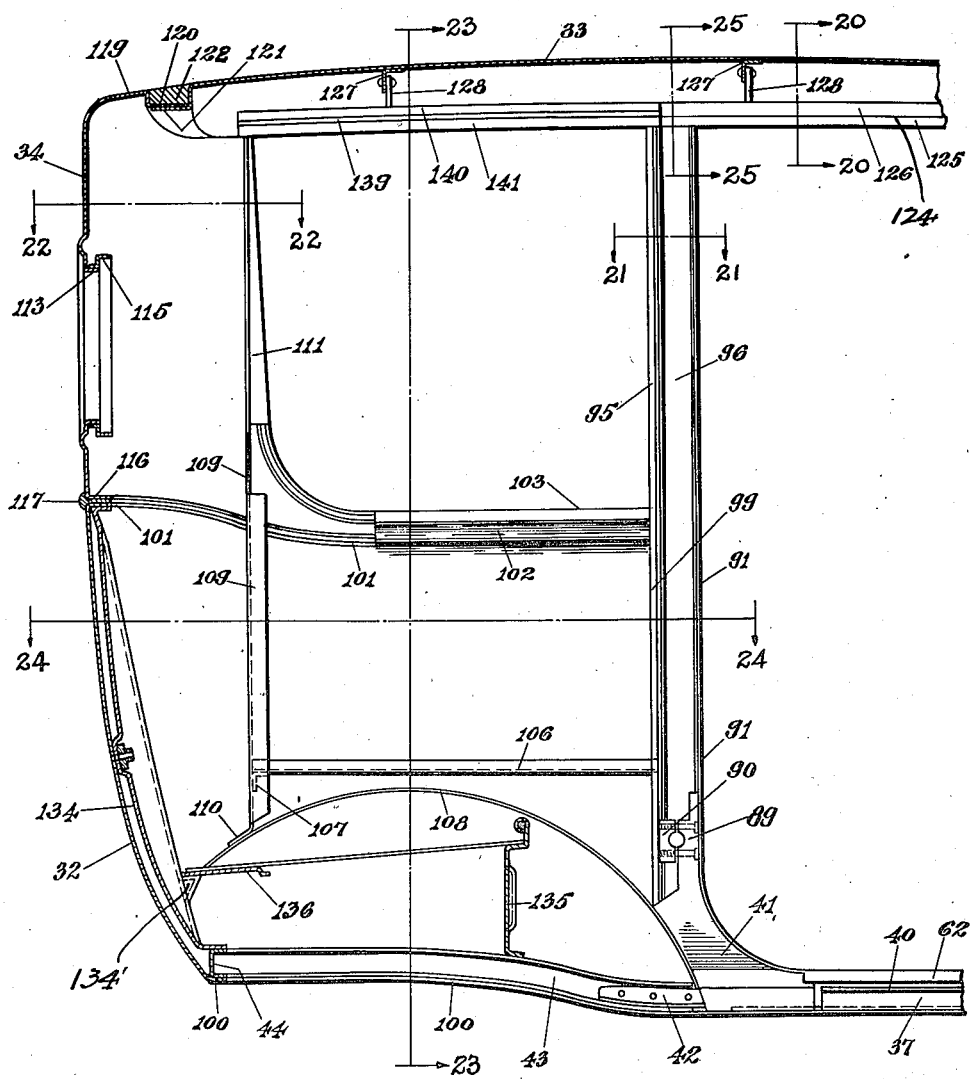
Fig. 5 is a vertical, longitudinal, sectional view through the rear portion of the body, Figs. 4 and 5 together giving a complete vertical section on the longitudinal center line of the body, the doors being removed.

In general, I attain the objects of my invention by providing a skeleton frame, made up of pressed metal stampings, which takes the stresses and strains coming on the body in use and transmits them to the chassis frame of the automobile, and a shell to give external appearance to the body and made up of sheet metal panels pressed to the desired shape and contour and rigidly secured to the skeleton frame. The skeleton frame may comprise body sills, extending longitudinally of the body and connected by cross members at appropriate points, door posts extending vertically upward from said sills, and a roof-panel reinforcing frame rigidly secured to the upper ends of said door posts. The shell may comprise a cowl panel, side panels and a tonneau panel secured to the sills and door posts, a roof panel secured to the roof reinforcing frame and a rear panel between the upper edge of the tonneau panel and the roof panel.

In this application I have illustrated a "closed" body of the sedan type but it is to be understood that my invention is not to be restricted to the sedan type of body and may be embodied in other "closed" bodies, such as those of the coupé or limousine type. Many of the features of construction illustrated here in connection with the sedan body may be utilized in connection with other types of "closed" bodies.

In the accompanying drawings, I have illustrated a sedan body embodying my invention. This body includes the cowl panel, 30, tonneau panel, 32, roof panel, 33, rear panel, 34, front doors, 35, and rear doors, 36. The cowl panel, 30, and the tonneau panel, 32, may be of substantially the same construction used in touring car bodies. The rear panel, 34, as shown in Fig. 1, mounted on the rear upper edge of the tonneau panel, 32, and its upper edge is connected to the rear edge of the roof panel, 33, the latter being supported on the upper ends of the various door posts, as will be described hereinafter. In this body, the shell is made up of the panels, 30, 32, 33 and 34. The skeleton framework includes a pair of longitudinally extending body sills, 37, one at each side of the body, which, in this case, extend from the front end of the body to the rear corners of the rear door openings. These body sills, in this case, are of the shape shown in Figs. 11, 12 and 14, having the outer flange, 38, the inner flange, 39, and the ledge, 40, upon which the floor boards may rest. The flange, 38, has a longitudinal curvature conforming to the lower edge of the body while the flange, 39, is straight, longitudinally. This straight sill construction is described and claimed in my pending application, Serial No. 290,787, filed April 17th, 1919, and the particular sill construction illustrated here is described and claimed in my Patent No. 1,431,314, dated October 10, 1922. The rear ends of the body sills, 37, are connected to brackets, 41, located at the rear lower corners of the rear door openings and connected to the tonneau panel, 32, at those points. Each bracket has a rearwardly-extending arm, 42, to which the forward end of one of the tonneau side sills, 43, is connected. The rear ends of said side sills are connected by the tonneau rear sill, 44. The body sills, 37, may also be connected together by the cross members, 45 and 46, located adjacent the central door posts. Of course, the various body panels also serve to tie the body sills together.

Figure 9:
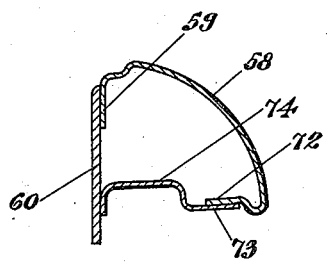
Fig. 9 is a sectional view through the upper part of one of the front door posts, taken on the line 9—9 of Fig. 4.
Figure 10:
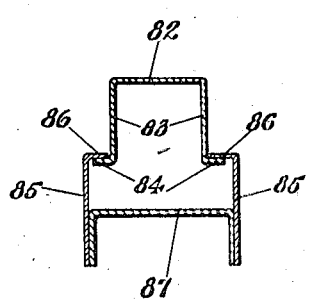
Fig. 10 is a sectional view through one of the central door posts, taken on the line 10—10 of Fig. 4.
Figure 15:
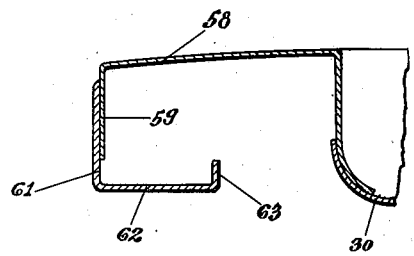
Fig. 15 is a sectional view through one of the front door posts, taken on the line 15—15 of Fig. 4.
Figure 16:
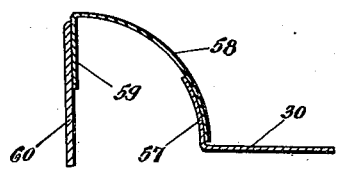
Fig. 16 is a similar view taken on the line 16—16 of Fig. 4.
Figure 17:
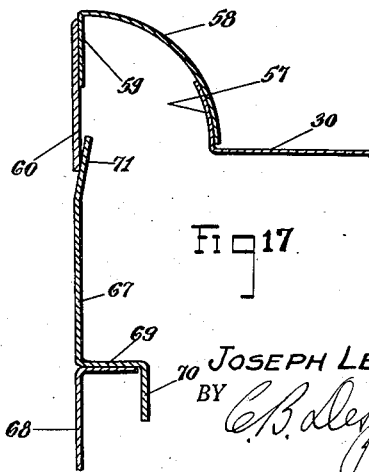
Fig. 17 is a sectional view through one of the front door posts and part of the instrument board, taken on the line 17—17 of Fig. 4.

The cowl panel, 30, is formed into arch shape so as to form the part of the body in front of the front doors. A ledge, 47, is pressed in the forward edge portion of the cowl panel, 30, to receive the rear edge of the engine hood (not shown), and an inwardly-extending flange, 48, is provided at the forward edge of this ledge to which the edges of the cowl pan, 49, are secured. A stamping, 50, is secured to the inner face of this cowl pan and is provided with an angularly disposed seat in line with the inclined ledges, 52, at the upper edges of the toe-board supports, 51. These toe-board supports are rigidly secured, by welding or otherwise, to the forward ends of the body sills, 37, as shown in Fig. 19. The side portions of the cowl panel, 30, have the inwardly extending flanges, 53, at their lower edges, which extend under and are welded or otherwise secured to the body sills, 37, as shown in Fig. 19. The rear edge portions of the cowl panel, 30, are reinforced and strengthened by the front door posts, which extend above the upper edge of the cowl panel to the roof structure, forming a support for the forward portion of this roof structure and for the windshield. This front door post construction is illustrated here more particularly in Figs. 9, 15, 16, 17 and 18, and comprises a cap member, 58, the lower portion of which is secured to the laterally-extending flange, 57, on the cowl panel, 30. The cap member, 58, also has an inturned flange, 59, to which the reinforcing strip, 60, is rigidly secured, for instance, by welding. The cap member, 58, extends from the floor-line to the roof of the body and is of varying cross-section, as shown in Figs. 1, 4, 15, 16, 17, 18 and 9. The cap member 58, is wider at its lower end, as shown in Fig. 15, and is substantially channel-shaped in cross-section. Above this portion, the cap-member gradually changes into the curved, quarter-round configuration seen in Figs. 16, 17 and 18, and this portion of the cap-member extends to the upper edge of the cowl panel. From the upper edge of the cowl panel to the roof, the quarter-round cap-member, 58, has an inturned flange, 72, at its forward edge, as shown in Fig. 9. The rear upper portion of the cowl panel, 30, is turned upwardly to form a vertically-extending portion, 64, provided with a transverse stiffening bead and, at the upper edge of this portion, there is a lateral flange, 65, extending above and rigidly secured to a transverse stiffening bar, 66, located below the lower edge of the windshield. The edge of this portion, 64, of the cowl panel, is secured to the inner surface of the cap member, 58, as shown in Fig. 18. An instrument board support, 67, extends transversely across the body, at the upper portion of the cowl panel, and the flange, 55, on the upper edge of said instrument board support, is rigidly secured to the stiffening bar, 66. This support, 67, has a recess formed therein in which the instrument board, 68, fits, said board being secured to the flanges, 69, formed on the support at the edges of said recess. At the ends of the instrument board, the flange, 69, is provided with a projecting portion, 70, extending behind the instrument board, 68, as shown in Fig. 17, and forming a stop to position the instrument board. The outer ends of the instrument board support, 67, are deflected slightly, at 71, so as to lie behind the reinforcing strips, 60, of the front door posts. In Fig. 9, I have shown a section through one of the front door posts, above the cowl panel, and, at this point, the cap member, 58, is provided with an inwardly-extending flange, 72, to which the flange 73, of the channel member, 74, is secured. The other wall of said channel, 74, may be secured, by welding or otherwise, to the reinforcing strip, 60. The channel, 74, receives the frame of the windshield, 75. I have illustrated and described one of the front door posts and it will be understood that this construction is duplicated at the other side of the body.

Figure 11:
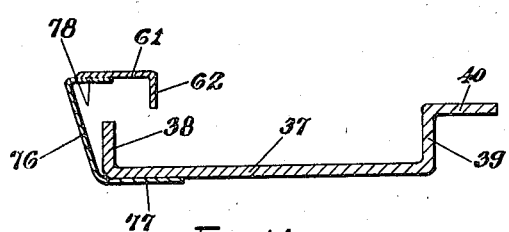
Fig. 11 is a sectional view through one of the body sills at the rear door opening, taken on the line 11—11 of Fig. 4.
Figure 12:
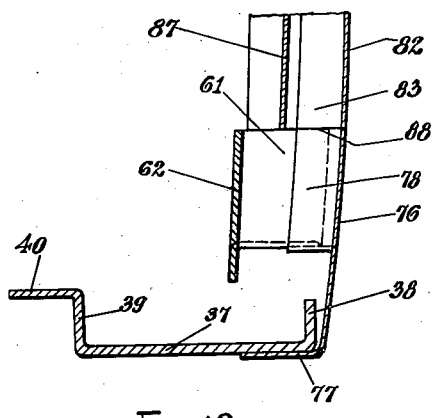
Fig. 12 is a sectional view through one of the body sills at the central door post, taken on the line 12—12 of Fig. 4.
Figure 13:
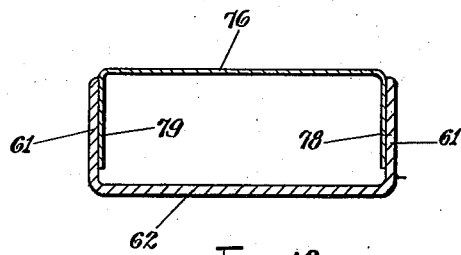
Fig. 13 is a sectional view at the base of one of the central door posts, taken on the line 13—13 of Fig. 4.
Figure 14:
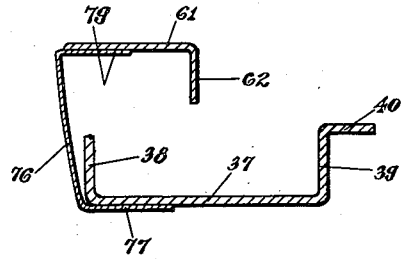
Fig. 14 is a sectional view through one of the body sills at the front door opening, taken on the line 14—14 of Fig. 4.

The side panels, 76, form the part of the outer shell of the body beneath the door openings. Each side panel has a flange, 77, at its lower edge, extending beneath and rigidly secured, by welding or otherwise, to the body sill, 37, as shown in Figs. 11, 12 and 14. Each side panel, 76, has an inturned flange, 78, at its upper edge, (see Fig. 11) forming part of the threshold of the rear door opening, and a similar flange, 79, (see Fig. 14) forming part of the threshold of the front door opening. The side panels, 76, are stiffened and reinforced at the thresholds of the front and rear door openings by means of the threshold strip, 62, which has the flanges, 61, externally applied and secured to the flanges, 78 and 79, respectively, of the side panel. The member, 62, may have a flange, 63, at the forward end thereof, as shown in Fig. 15, to give this part a channel formation and add to its strength. The lower end of the reinforcing strip, 60, of the front door post structure, is welded to the front end of the member, 62, and the flange, 59, of the cap member, 58, of said front door post, is also applied and welded to the flange, 61, as shown in Fig. 15.

There are two central door posts, one at each side of the body. Each central door post comprises the channel member, 82, having the side walls, 83, provided with the laterally-extending flanges, 84. The strips, 85, are provided with inturned flanges, 86, engaging over the flanges, 84, and forming stop shoulders with which the front and rear doors cooperate. The channel member, 87, interposed between the strips, 85, serves to stiffen and reinforce the structure, so that we have a central door post which is, in effect, a box girder or column, provided with shoulders on opposite sides thereof serving as stops for the free edges of the doors. The lower end of each door post is welded or otherwise rigidly secured to the member, 62, and the side panel, 76, at the point, 88, and the door post extends upwardly therefrom to the roof structure.

The reinforcing brackets, 41, are each provided with a vertically-extending portion, 89, applied and secured to one of the front, vertical edges of the tonneau panel. The rear door-post structure includes the reinforcing strip, 91, which is applied and secured to the inturned flange, 97, at the forward edge of the tonneau panel, 32, and the bracket, 41. This strip, 91, extends vertically upward beyond the upper edge of the tonneau panel to the roof structure and, between the upper edge of the tonneau panel and the roof structure, there is a post cap, 92, having an inturned flange, 93, secured to the strip, 91. This construction is shown in Fig. 21. A channel member, 96, has one wall thereof secured to the strip, 91, and, to the other wall thereof, there is secured the angle member, 95, forming a part of the channel in which the window, 104, slides. Below the top edge of the tonneau panel, the channel for the window is defined by a shorter angle member, 99, secured to the angle member, 95, as shown in Fig. 24. Above the top edge of the tonneau panel the angle member, 95, is provided with a flange, 98, which lies against and is secured to the flange, 94, of the post cap, 92. The window frame, 105, is secured in position by the moulding, 99′, detachably secured to the angle member, 95, as shown in doted lines in Fig. 21. The channel member, 96, not only serves to stiffen the door post structure, but also receives a wooden tacking strip to which the interior trimming may be tacked.

The tonneau panel, 32, is provided with an inturned flange, 100, at its lower edge, which is secured to the tonneau side sills, 43, the rear sill, 44, and the rear ends of the body sills, 37. An inturned flange, 101, is also provided at the upper edge of the tonneau panel, 32, and runs part-way toward the front of the tonneau panel until it meets the beads, 102, formed in the forward side portions of said panel, as shown in Fig. 5. A flange, 103, is formed at the upper edge of the beaded portion described, and forms the lower rail for the side window, 104. This window has the frame, 105, carrying the glass, and is adapted to be dropped into a well or pocket, formed in the side of the tonneau panel so that the lower edge of the frame rests on the cross bar, 106, and is supported thereby. One end of said cross bar is secured to the rear door post structure while the other end is supported by a clip, 107, as shown in Fig. 5, carried by the window guide, 109. The lower end, 110, of said window-guide is secured to the wheel housing flange, 108, and said guide extends vertically upward to the roof structure. The upper portion of the window guide, 109, is Z-shaped in cross section, as shown in Fig. 22, having a lateral flange, 112, applied and rigidly secured to the flange, 118, at the forward, vertical edge of the rear panel, 34.

The rear panel, 34, extends from the upper edge of the tonneau panel to the roof and, in this panel, there is provided the flanged opening, 113, for the rear window, 114, in which opening is mounted the angle window frame, 115. An inturned flange, 116, is formed at the lower edge of the rear panel, 34, which flange matches and cooperates with the flange, 101, of the tonneau panel. A T-shaped moulding, 117, bent to the contour of the upper edge of the tonneau panel, may be inserted between flanges, 101 and 116, and these three parts rigidly secured together in this position. The side portions of the rear panel are bent forwardly and secured to the window guide, 109, through the flange, 118, as shown in Fig. 22. The upper portion of the rear panel is bent forwardly, at 119, to form the rear end of the roof structure and this part has a depressed flange, 120, which engages and is rigidly secured to the depressed flange, 121, at the rear end of the roof panel, 33. These depressed flanges together form a channel, in which is located a bar, 122, to reinforce these parts at this joint.

Figure 6:
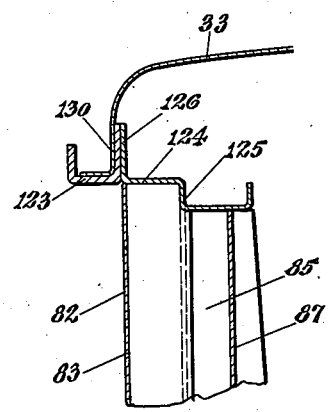
Fig. 6 is a detail, sectional view, taken on the line 6—6 of Fig. 4, and showing the connection between the roof structure and one of the central door posts.
Figure 7:
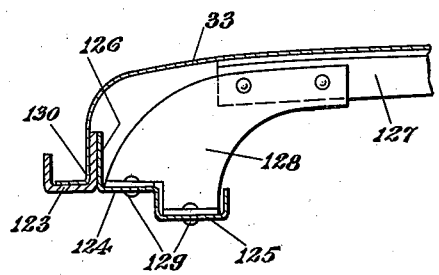
Fig. 7 is a sectional view through a portion of the roof structure, taken on the line 7—7 of Fig. 4.
Figure 8:
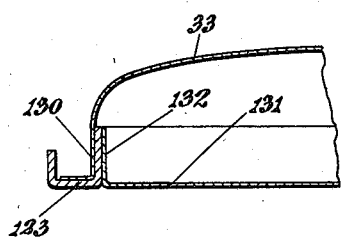
Fig. 8 is a sectional view through a portion of the roof structure, taken on the line 8—8 of Fig. 4.

Longitudinally extending angle members, 124, are mounted on and rigidly secured to the upper ends of the door posts, as shown in Figs. 4, 5, 6 and 7. Each angle member, 124, has a channel, 125, formed therein which provides a stop shoulder for the upper edges of the doors and may also receive a wooden tacking strip, (not shown) to which the interior trimming may be attached. The flange, 126, at the outer edge of the angle member, 124, lies against and is rigidly secured by welding or otherwise, to one wall of the drip channel, 123, as shown in Fig. 6. The roof panel, 33, is braced at intervals by cross ribs formed by the angle bars, 127, the ends of which are conencted by brackets, 128, with the angle bars, 124, being secured thereto in any suitable manner, for instance, by means of the rivets, 129. The side portions of the roof panel, 33, are pressed downwardly into the drip channels, 123, at each side of the body, and are secured therein at 130, as shown, for instance, in Fig. 6. At the forward end of the roof structure, there is provided the panel, 131, having a flange, 132, secured to one wall of the drip channel, 123, and a transverse stiffening channel, 133, secured to the upper ends of the front door posts. The longitudinally-extending angle members, 124, terminate at the rear door posts, as shown in Fig. 5, and the space between their ends and the rear panel, 34, at the upper edges of the side windows, is filled by the mouldings or panels, 139, each having the upper flange, 140, secured to one wall of the drip channel, 123, and the lower inturned flange, 142, to which is secured the channel member, 141, to receive the upper edges of the window frame. The rear set of brackets, 128, may be connected to these mouldings or panels, 139.

The tonneau panel is braced by a rear brace member 134 secured at the top to the flange 101 and at the bottom to the top of the rear sill 44, as clearly shown in Figure 5. The rear seat heel board 135 extends transversely between the sides of the tonneau panel and rests on and is secured at its ends to the tonneau side sills 43, (Fig. 23). A rear seat support 136 is supported centrally on a projection 134' extending from brace member 134 and laterally by any suitable means (not shown). The lateral seat supports 136' are secured at their forward and rear ends, respectively, to the heel board 135 and to the rear seat support 136. The seat supports 138 carrying the individual front seats 137 shown in dotted lines in Figure 4, may be adjustably mounted on the cross members, 45 and 46.

From the foregoing description, my invention should be very clearly understood. The back-bone of the skeleton frame of the body is constituted by the body sills, 37, and the tonneau side sills, 43, which form, in effect, continuations of the body sills. The body is connected to and mounted on the chassis frame of the motor vehicle through these sills, so that all forces and stresses acting on the body are transmitted, ultimately, through these sills to the chassis frame. The skeleton frame also includes the front, central and rear door post structures, which are tied to the sill structures, so as to transmit the stresses and strains to them. These door post structures are part of the skeleton frame, although portions of the body enter into and form part of them. The front and central door posts are tied to the body sills by the threshold members, 62, which reinforce the side panels, 76, beneath the door openings and form bases for the door posts, to which the lower ends of the door posts are rigidly connected by welding or otherwise. The rear door posts are connected to the body sills by the reinforcing brackets, 41, which also serve to reinforce the lower forward corners of the tonneau panel. The framework for the roof structure is made up of the longitudinally-extending members, 124, and the cross ribs, 127, carried thereby. These longitudinally-extending members are supported by and rigidly secured to the upper ends of the door posts, as hereinabove described. The rear panel is supported by the upper edge of the tonneau panel and, since the side and upper portions of this panel are bent forwardly and secured to the window-guides, 109, and the rear end of the roof panel, 33, respectively, this rear panel is formed into such a shape that it acts substantially like a supporting column for the rear end of the roof panel, 33. This roof panel is applied over and supported by the framework for the roof structure, which we have described.

Provision is made, at various places, for the insertion of wooden blocks or tacking strips to which the upholstery or interior trimming for the body may be attached. For instance, such strips may be inserted in the channels, 87, 96, 125, 133 and at various other places in the construction of the body, where desired. These wooden tacking strips are not considered a part of the body proper, since they are added, after the enamel has been baked on the body, solely for convenience in attaching the upholstery. The usual floor boards are provided, which rest on the ledges, 40, of the body sills, 37, with their ends abutting the threshold members, 62. The toe boards rest on the supporting ledges, 52, of the toe-board supports, 51.

The front and rear doors, 35 and 36, respectively, are hinged on the front and rear door posts and their free edges cooperate with the shoulders of the central door posts. The strains due to the swinging of the doors are taken by the front and rear door posts and transmitted to the body sills, while the shocks due to the slamming of the doors are transmitted through the central door posts to the body sills. The weight of the roof structure is transmitted largely through the door posts to the body sills, as well as any strains due to the swaying of the roof or body from one side to the other when traveling at high speed.

I am aware that this particular embodiment of my invention may be altered materially without departing from the spirit of my invention and, therefore, I claim my invention broadly, as indicated by the appended claims.

Having thus described my invention, what I claim as new and desire to secure by Letters Patent is:—

1. In a sheet metal closed body structure for automobiles, a plurality of sheet metal panels shaped to the desired contour to form, respectively, the sides, back and roof of the body, said panels being secured together at their meeting edges to form a self-contained substantially integral all-steel body structure, said roof panel having flanged edge portions, said body having doorway openings in the sides thereof extending substantially from the edge portion of the roof panel to the floor line of the body, and channel members disposed horizontally above said doorways and secured to said flanged edge portion of said roof panel.

2. In a sheet metal closed body structure for automobiles, a plurality of sheet metal panels shaped to the desired contour to form respectively the sides, back and roof of the body, said panels being secured together at their meeting edges to form an integral structure, said roof panel having edge portions, said body having doorway openings in the sides thereof extending substantially from the edge portion of the roof panel to the floor line of the body, and channel members disposed horizontally above said doorways and secured to said edge portions of said roof panel, said channel members extending inwardly to afford means for attaching the trim.

3. A sheet metal closed body structure for automobiles, comprising a pair of longitudinally-extending metal body sills, a pair of metal reinforcing brackets connected to the rear ends of said sills, a tonneau reinforcing frame secured to said brackets, a sheet metal cowl panel mounted on the forward ends of said sills, a sheet metal tonneau panel mounted on said tonneau frame and secured to said brackets a pair of vertically-extending metal door posts secured to said cowl panel, a pair of vertically-extending metal door posts secured to said brackets, a roof framework carried by the upper ends of said door posts, and a roof panel mounted on said roof framework.

4. A sheet metal closed body structure for automobiles comprising a plurality of door posts and a roof supporting framework including longitudinally-extending metal stringers secured to the upper ends of said door posts, said stringers having longitudinal channel portions at their inner edges adapted to receive tacking strips for the upholstery and a roof panel supported by said framework.

5. A sheet metal closed body structure for automobiles comprising a plurality of door posts and a roof-supporting frame-work including longitudinally extending metal stringers secured to the upper ends of said door posts, a drip channel at the outer edge of the roof secured to said stringers, and a sheet metal roof panel supported by said framework, the edge portion of said panel extending into and being rigidly secured in said drip channel.

6. A sheet metal closed body structure for automobiles comprising a pair of longitudinally-extending metal body sills, a sheet metal tonneau panel connected to the rear ends of said sills, a sheet metal cowl panel mounted on the forward ends of said sills, a plurality of metal door posts extending upwardly from said sills beyond the upper edges of said panels, and a roof-supporting framework including longitudinally-extending metal stringers secured to the upper ends of said door posts, a sheet metal rear panel mounted on the upper edge of said tonneau panel, and a roof panel secured to said framework and having its rear edge connected to the upper edge portion of said rear panel.

7. A sheet metal closed body structure for automobiles comprising a pair of longitudinally-extending metal body sills, a sheet metal tonneau panel connected to the rear ends of the sills, a sheet metal cowl panel mounted on the forward ends of said sills, a plurality of metal door posts extending upwardly from said sills beyond the upper edges of said panels, and a roof supporting framework including longitudinally-extending metal stringers secured to the upper ends of said door posts, a sheet metal rear panel mounted on the upper edge of said tonneau panel and having its side and upper portions bent forwardly, and a roof panel secured to said frame work and having its rear edge secured to and supported by said rear panel.

8. A sheet metal body structure for automobiles comprising a pair of longitudinally-extending body sills, a pair of sheet metal side panels secured to said sills and extending across the thresholds of the doors, a pair of threshold-reinforcing stampings secured to said side panels and having their upper edges conforming to the lower portions of the door openings, and a pair of vertically-extending sheet metal door posts having their lower ends rigidly secured to said threshold-reinforcing stampings.

9. A closed body structure for automobiles comprising a skeleton frame for taking the stresses and strains in the completed body during the use thereof including a pair of longitudinally extending body sills, a plurality of door posts extending upwardly from said sills and longitudinally extending angle members of stepped cross section mounted and secured to the upper ends of said door posts, said latter members having depending portions constituting door stops and upwardly extending portions adapted for securement thereto of a roof member.

10. In a pressed metal automobile body, a top rail of a section comprehending an outer portion extending upwardly, and forming a support for a roof member, a web portion extending horizontally and another portion extending downwardly and forming a door stop.

11. In an automobile body, a longitudinally extending body sill, a vertically extending door post secured to said body sill, and a channel shaped top rail rigidly secured to the upper end of said door post, the base of said top rail being offset to form a stop shoulder for the door.

12. A sheet metal automobile body structure comprising an upper rear tonneau panel arched over forwardly and provided with an inturned flange, and a roof section likewise provided with an inturned flange together with means connecting the flanges together.

13. A sheet metal automobile body structure comprising a tonneau rear panel arched over at the top forwardly and provided with an inturned flange at its forward edge, together with a roof structure supported by said inturned flange.

14. A roof structure for closed body automobiles comprising a rear edge section supported from the tonneau and having a flanged advance edge, connected top rail sections of angle cross section having vertically and horizontally extending branches, and another section supported jointly from the flanged advance edge of said rear section and the vertically extending branches of said top rails.

15. In a sheet metal closed body structure for automobiles, a plurality of sheet metal panels pressed to the desired contour to form portions of the vertical side walls and roof of the body, said panels having horizontally extending offset engaging flanges at their meeting edges overlapping and rigidly secured together to form a channel section reinforcing structure at the juncture of said panel, and a filler member secured in the channel formed by said offset flanges.

16. In a sheet metal body structure for automobiles, the combination of a sheet metal cowl panel having a transversely-extending portion at the rear upper edge thereof, a pair of metal door posts secured to the vertical side portions of the cowl panel, a metal stamping secured to the transverse portion of the cowl panel and provided with a recess having marginal flanges, and an instrument board positioned in said recess and secured to said flanges.

17. In a sheet metal body structure for automobiles, the combination of a sheet metal cowl panel having a transversely-extending portion at the rear upper edge thereof, a pair of metal door posts secured to the vertical side portions of the cowl panel, a metal stamping secured to the transverse portion of the cowl panel and provided with a recess having marginal flanges, and an instrument board positioned in said recess and secured to said flanges, said flanges having portions extending behind the instrument board.

18. In a sheet metal body structure for automobiles, the combination of a sheet metal cowl panel having a transversely-extending portion at the rear upper edge thereof, a pair of metal door posts secured to the vertical side portions of the cowl panel, and a metal stamping, forming an instrument board support, secured to the transverse portion of the cowl panel and extending between the door posts, the ends of said stamping being deflected and overlapping portions of the door posts.

19. In a sheet metal body structure for automobiles, the combination of a sheet metal cowl panel having a horizontal flange at its rear upper edge, a stiffening bar secured to said flange, a pair of metal door posts secured to the vertical side portions of the cowl panel, and a metal stamping extending between the door posts and forming an instrument board support, the upper edge of said stamping being provided with a horizontal flange secured to said stiffening bar.

20. In a pressed metal automobile body construction, a pair of front door posts, a cowl panel to the rear vertical edges of which the posts are secured, and an integral upstanding portion at the rear of said panel, said portion lying substantially in the plane of the forward walls of the door posts and secured thereto.

21. A front end construction for vehicle bodies including in combination, a pair of channel-shaped pillars, a wind-shield header extending between and secured to the walls of the channel pillars, a channel-shaped belt panel secured to the walls of the channel pillars, a cowl secured to one wall of the channel shaped belt panel, and an instrument board secured to the belt panel.

22. In a pressed metal automobile body construction, a pair of oppositely disposed front door posts of inwardly presenting channel formation, a channeled peak panel extending between and interconnecting the tops of said front door posts, the side walls of the channel of the peak panel being connected to the walls of the door post channels.

23. In a sheet metal body structure for automobiles, the combination with a cowl panel of a front door post structure comprising a substantially vertically extending member extending from the floor line to the roof of the body, said member being substantially channel-shaped in cross section at its lower end and of curved quarter round configuration at its upper end.

24. In a sheet metal body structure for automobiles, the combination with a cowl panel, of a front door post structure comprising a substantially vertically extending member extending from the floor line to the roof of the body, said member being substantially channel-shaped in cross section at its lower end and of curved quarter round configuration at its upper end, the portion between said lower and upper ends being of varying cross section.

25. In a sheet metal closed body structure for automobiles, a front door-post structure comprising, in combination with a cowl panel, a metal cap member secured to a flange on the cowl panel and extending above the latter, the rear edge of said cap member having an inturned flange, a metal bar secured to said inturned flange, and a metal reinforcing member secured to said bar and the portion of the cap member above the cowl panel, to form a hollow post structure.

26. In a sheet metal closed body structure for automobiles, a front door-post structure comprising, in combination with a cowl panel, a metal cap member secured to a flange on the cowl panel and extending above the latter, the rear edge of said cap member having an inturned flange, a metal bar secured to said inturned flange, and a metal reinforcing member, having a longitudinally-extending channel, and secured to said bar and the portion of the cap member above the cowl panel to form a hollow post structure.

27. In a sheet metal closed body structure for automobiles, a front door-post structure comprising, in combination with a cowl panel, a metal cap member secured to a flange on the cowl panel and extending above the latter, the rear edge of said cap member having an inturned flange, a metal bar secured to said inturned flange, the portion of said cap member above the cowl panel having an inturned flange at its forward edge, and a metal reinforcing member secured to said bar and said last-named flange, to form a hollow post structure.

28. In a pressed metal automobile body, a tonneau construction including a side panel provided at its lower portion with an inset portion constituting a wheel housing and in its upper portion with an opening constituting a rear quarter window opening, the edges of said opening being provided with an inturned flange, and a vertically extending brace extending between and secured to said inwardly extending flange and the top of the inset wheel housing.

29. In a sheet metal closed body structure for automobiles, the combination with a sheet metal tonneau panel, a sheet metal rear panel mounted on the upper edge of said tonneau panel, and a metal angle member having its lower end secured to a portion of the tonneau panel and its upper portion, above the tonneau panel, secured to a forwardly-extending portion of the rear panel.

30. In a sheet metal closed body structure for automobiles, the combination of a sheet metal tonneau shell formed to provide a window opening in its side portion, said tonneau shell being provided with inwardly-extending wheel housings, and a metal angle member having its lower end secured to one of the wheel housings, and its upper portion secured to a forwardly-extending portion of the tonneau shell at the rear edge of a side window opening.

31. In a sheet metal closed body structure for automobiles, the combination with a sheet metal tonneau shell formed to provide a window opening in its side portion, said tonneau shell being provided with inwardly-extending wheel housings, a metal door post secured to a forward edge of said tonneau shell, a window-guide secured to said door post, a second window-guide having its lower end secured to one of said wheel housings and its upper portion, above the tonneau panel, secured to a forwardly-extending portion of the tonneau shell, and a window rest positioned below the edge of the shell at the bottom of the window opening and connected to said window-guides.

32. In a sheet metal closed body structure for automobiles, a door post structure comprising a channel member having longitudinally-extending shoulders in the sides thereof, side strips engaging said shoulders and a stiffening member interposed between and secured to said side strips near the free edges thereof.

33. In a sheet metal closed body structure for automobiles, a door post structure comprising a channel member having outturned flanges at the free edges of the channel side walls, a pair of metal strips each having a marginal flange secured to one of said channel flanges, and a stiffening channel interposed between and secured to said strips.

34. In a sheet metal closed body structure for automobiles, the combination with a tonneau panel, of a metal bar secured to a forward vertical edge thereof and extending above said panel, a metal channel member having one side wall secured to said bar, a window guide secured to the other side wall of said channel, and a metal cap member rigidly secured to the portions of said bar and window guide above the upper edge of the tonneau panel.

35. In a sheet metal closed body structure for automobiles, the combination with a tonneau panel, of a metal bar secured to a forward vertical edge thereof and extending above said panel, a metal channel member having one side wall secured to said bar, with the channel facing inwardly and adapted to receive a tacking strip, a window guide secured to the other side wall of said channel, and a metal cap member having inturned flanges rigidly secured to the portions of said bar and window guide above the upper edge of the tonneau panel.

In testimony whereof, I affix my signature.

JOSEPH LEDWINKA.